(12) United States Patent
Masuzawa et al.

(10) Patent No.: US 10,758,975 B2
(45) Date of Patent: Sep. 1, 2020

(54) MOLDING DEVICE AND METHOD FOR MANUFACTURING MOLDED PRODUCT

(71) Applicant: TAIHO KOGYO Co., Ltd., Aichi (JP)

(72) Inventors: Hisaomi Masuzawa, Nagano (JP); Toshiaki Kitazawa, Nagano (JP)

(73) Assignee: TAIHO KOGYO CO., LTD., Aichi (JP)

( * ) Notice: Subject to any disclaimer, the term of this patent is extended or adjusted under 35 U.S.C. 154(b) by 339 days.

(21) Appl. No.: 15/579,923

(22) PCT Filed: Jun. 12, 2015

(86) PCT No.: PCT/JP2015/067065
§ 371 (c)(1),
(2) Date: Dec. 5, 2017

(87) PCT Pub. No.: WO2016/199300
PCT Pub. Date: Dec. 15, 2016

(65) Prior Publication Data
US 2018/0221945 A1 Aug. 9, 2018

(51) Int. Cl.
*B22D 29/00* (2006.01)
*B22C 9/10* (2006.01)
(Continued)

(52) U.S. Cl.
CPC ............ *B22D 29/001* (2013.01); *B22C 9/062* (2013.01); *B22C 9/101* (2013.01); *B22C 9/108* (2013.01);
(Continued)

(58) Field of Classification Search
CPC .. B22D 29/001; B22D 17/2236; B22D 17/24; B22C 9/062; B22C 9/101; B22C 9/108
See application file for complete search history.

(56) References Cited

U.S. PATENT DOCUMENTS

2011/0203763 A1   8/2011   Kaemmerer et al.

FOREIGN PATENT DOCUMENTS

| JP | 3-221423 A | 9/1991 |
| JP | 8-276259 A | 10/1996 |

(Continued)

OTHER PUBLICATIONS

International Search Report in PCT/JP2015/067065, dated Aug. 4, 2015, 3pp.

(Continued)

*Primary Examiner* — Kevin P Kerns
*Assistant Examiner* — Steven S Ha
(74) *Attorney, Agent, or Firm* — Hauptman Ham, LLP

(57) ABSTRACT

Provided is a molding device for manufacturing a molded product having an arc-shaped bent inner space, wherein the molding device includes: a pair of molds which is joinable to each other and separable from each other, and is capable of forming a cavity C which has a shape corresponding to an outer shape of the molded product in a joined state during molding; a core which has a shape corresponding to an inner shape of the molded product, and is disposed in the inside of the cavity C which the pair of molds forms during molding; and a rotation member which is joined to a terminal end of the core, and is rotatable together with the core after molding. Compared to a conventional molding device, the molding device of the present invention becomes a molding device capable of suppressing the occurrence of a defect on a molded product having an arc-shaped bent inner space at the time of taking out the molded product.

10 Claims, 12 Drawing Sheets

(51) Int. Cl.
  *B22D 17/24* (2006.01)
  *B29C 45/26* (2006.01)
  *B29C 45/44* (2006.01)
  *B22C 9/06* (2006.01)
  *B22D 17/22* (2006.01)

(52) U.S. Cl.
  CPC ......... *B22D 17/2236* (2013.01); *B22D 17/24* (2013.01); *B29C 45/2681* (2013.01); *B29C 45/44* (2013.01)

(56) References Cited

FOREIGN PATENT DOCUMENTS

| | | |
|---|---|---|
| JP | 2001-260182 A | 9/2001 |
| JP | 2002-18904 A | 1/2002 |

OTHER PUBLICATIONS

Extended European Search Report in EP Application No. 15894985.9, dated Oct. 19, 2018, 7pp.

FIG.2
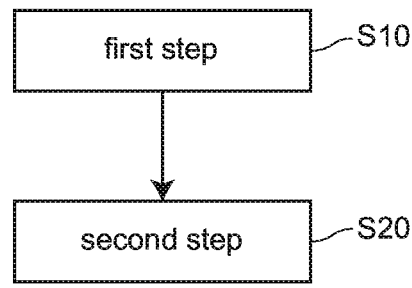
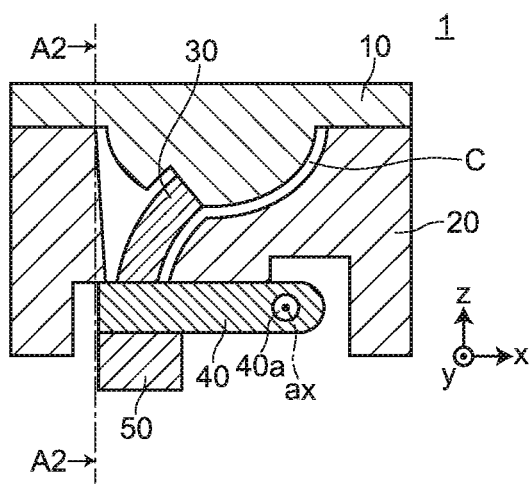
FIG.3A
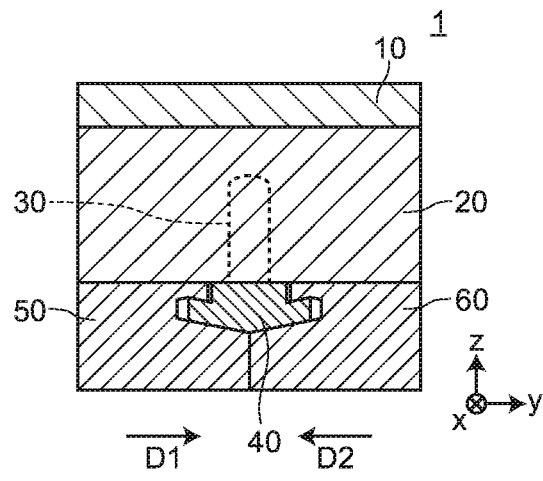
FIG.3B
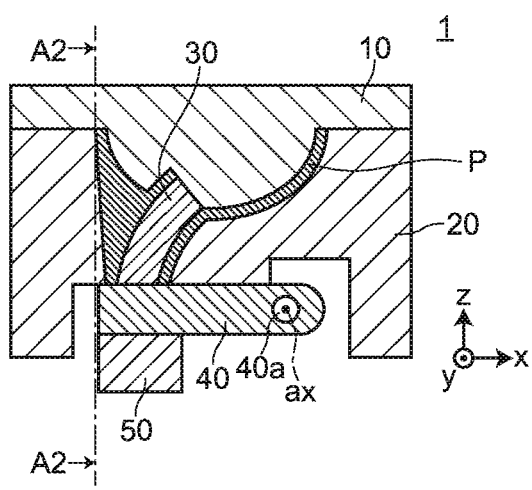
FIG.3C

MOLDING DEVICE AND METHOD FOR MANUFACTURING MOLDED PRODUCT

RELATED APPLICATIONS

The present application is a National Phase of International Application Number PCT/JP2015/067065, filed Jun. 12, 2015.

TECHNICAL FIELD

The present invention relates to a molding device and a method for manufacturing a molded product.

BACKGROUND ART

In a technical field of molding using a mold (cast molding, injection molding or the like), to manufacture a molded product having an inner space, a molding technique has been well-known where molding is performed using a core (also referred to as an inner core or a cavity core) which has a shape corresponding to an inner shape of the inner space. When the shape of the inner space is simple, it is possible to take out a molded product using a simple molding device (for example, a molding device where a core and a molded product are linearly separated from each other simultaneously with separation of molds by projecting an ejector pin). However, in the manufacture of a molded product having an arc-shaped bent inner space, a core and a molded product interfere with each other. Accordingly, it is difficult to take out the molded product with a molding device having a simple configuration. Particularly, in the manufacture of a molded product made of metal, compared to the case where a molded product made of a resin is manufactured, it becomes further difficult to take out a molded product with a molding device having a simple configuration. This difficulty is caused by properties of metal that metal has, in general, high strength, low elasticity, a strong shrinking force (a so-called catching force) when solidified and the like compared to a resin.

As a molded product having an arc-shaped bent inner space, a part associated with an engine of an automobile, particularly, a part used for forming an intake manifold, various housings or the like are exemplified.

Due to the reasons set forth above, in a technical field of molding using a mold, there has been made steady development and studies with respect to a molding device for manufacturing the above-mentioned molded products (see patent literature 1, for example). Hereinafter, one example of conventional molding devices is described.

FIG. 13A and FIG. 13B are views for describing a conventional molding device 900. FIG. 13A is a perspective view of the molding device 900 after a molding operation is finished, and FIG. 13B is a side view of a core 930, a support member 940 and an ejector pin 950.

As shown in FIG. 13A and FIG. 13B, the conventional molding device 900 includes a pair of molds 910, 920 which is joinable to each other and separable from each other, and is capable of forming a cavity which has a shape corresponding to an outer shape of a molded product P0 in a joined state during molding. The molding device 900 also includes a core 930 which has a shape corresponding to an inner shape of the molded product P0, and is disposed in the inside of a cavity which the pair of molds 910, 920 forms during molding. The molding device 900 also includes a support member 940 which supports the core 930 from the outside. The molding device 900 also includes an ejector pin 950 which is linearly (one-dimensionally) advanceable and retractable along a direction perpendicular to a direction in which the pair of molds 910, 920 is separable from each other, and ejects the molded product P0 formed around the core 930.

According to the conventional molding device 900, the molded product P0 having an arc-shaped bent inner space can be taken out by taking, after molding, a step of separating the pair of molds 910, 920, a step of separating the core 930 and the molded product P0 together with the support member 940 from the mold 920, and a step of ejecting the molded product P0 by the ejector pin 950 in order.

CITATION LIST

Patent Literature

PTL 1: JP-A-8-276259

SUMMARY OR INVENTION

Technical Problem

However, in the conventional molding device, there exists a drawback that a defect is liable to occur on a molded product when the molded product is taken out. Particularly, in manufacturing a molded product made of metal, an irreversible deformation is liable to occur on a molded product due to properties of metal. Accordingly, compared to a case where a molded product made of a resin is manufactured, a defect is more liable to occur on a molded product. Under such circumstances, in a technical field of a molded product made of metal, there has been a strong demand for a solution to the above-mentioned drawback.

The present invention has been made to overcome such drawbacks, and it is an object of the present invention to provide a molding device capable of, at the time of taking out a molded product having an arc-shaped bent inner space, suppressing the occurrence of a defect on the molded product compared to a conventional molding device. Further, it is another object of the present invention to provide a method for manufacturing a molded product capable of, at the time of taking out a molded product having an arc-shaped bent inner space, suppressing the occurrence of a defect on the molded product compared to the method for manufacturing a molded product using the conventional molding device.

Solution to Problem

[1] A molding device according to the present invention is a molding device for manufacturing a molded product having an arc-shaped bent inner space, wherein the molding device includes: a pair of molds which is joinable to each other and separable from each other, and is capable of forming a cavity which has a shape corresponding to an outer shape of the molded product in a joined state during molding; a core which has a shape corresponding to an inner shape of the molded product, and is disposed in the inside of the cavity which the pair of molds forms during molding; and a rotation member which is joined to a terminal end of the core, and is rotatable together with the core after molding.

The molding device according to the present invention can be used for manufacturing molded products made of various molding materials. However, as will be described later, the molding device according to the present invention can be used particularly for manufacturing a molded product made of metal.

The molding device according to the present invention in particular can be preferably used in a field of injection molding or die-cast molding.

In this specification, "arc-shaped" indicates not only "strictly arc" but also "a shape close to an arc shape (for example, a curved line which follows an ellipse, a shape formed by adding a straight line to an end portion of an arc or the like). Accordingly, the core used in the molding device according to the present invention may not have a shape bent in an "arc-shaped" bent shape in the strict meaning of the term.

In this specification, "joinable to each other and separable from each other" includes a state where the pair of molds is openable and closeable along one direction. "joined state" means a so-called "mold closed state", and "separated state" means a so-called "mold opened state".

In this specification, "a shape corresponding to an outer shape of the molded product" may be a shape corresponding to the entire outer shape of the molded product or may be a shape corresponding to a part of the outer shape of the molded product.

Further, in this specification, "a shape corresponding to an inner shape of the molded product" may be a shape corresponding to the entire inner shape of the molded product or may be a shape corresponding to a part of the inner shape of the molded product.

In this specification, "rotation" means not only a rotational movement which follows an arc of a true circle but also a movement which is regarded as a substantially rotational movement. As the movement which is regarded as a substantially rotational movement, a movement which follows an arc of an ellipse or a movement which follows an arc of a circle after moving on a straight line once can be exemplified.

In the present invention, "a pair of molds" may be formed of a so-called fixed-side mold and a so-called movable-side mold. "a pair of molds" may be a so-called slidable molds which are openable and closable molds in a direction different from the moving direction of the fixed-side mold and the movable-side mold. The molding device according to the present invention may include molds other than the above-mentioned pair of molds.

[2] In the molding device according to the present invention, it is preferable that the rotation member be rotatable about a predetermined rotation axis perpendicular to an imaginary plane along the arc as the center of rotation.

[3] In the molding device according to the present invention, it is preferable that, assuming a side where the cavity is formed during molding as viewed from a member disposed on a side closer to the rotation member than the cavity as one side, and assuming a side opposite to said one side as the other side, the molding device further include a fixing member capable of fixing the rotation member, and the fixing member be configured to fix the core and the rotation member by supporting the rotation member from said the other side during molding, and the fixing member allows the rotation member to be rotatable by retracting from said the other side of the rotation member after molding.

The molding device according to the present invention may include only one fixing member or a plurality of fixing members.

[4] In the molding device according to the present invention (the molding device in the above configuration [3]), it is preferable that, assuming a position where the fixing member is arranged when the core is pulled out from the molded product as a retracting position and assuming a position where the fixing member is arranged during molding as a fixing position, the fixing member be movable linearly between the retracting position and the fixing position, and as viewed from a position where the retracting position and the fixing position overlap with each other, a positional relationship between the retracting position and the fixing position of the fixing member and the rotation member during molding not be changed even when the fixing member takes either the retracting position or the fixing position.

In this specification, "as viewed from a position where the retracting position and the fixing position overlap with each other" may be also expressed as "as viewed along a moving axis of the fixing member". "a positional relationship with the rotation member not be changed" means that, as viewed in a plan view from the position where the retracting position and the fixing position overlap with each other, assuming a state where the fixing member and the rotation member are visible, the positional relationships (also referred to as a distance at the viewing point) between the fixing member at the retracting position and the rotation member, and between the fixing member at the fixing position and the rotation member are not changed.

[5] In the molding device according to the present invention (the molding device in the above configuration [4]), it is preferable that, assuming a moving direction of the fixing member from the retracting position to the fixing position as a first direction, the rotation member have a first tapered portion which is inclined from said one side to said the other side as the first tapered portion extends in the first direction, and the fixing member have a second tapered portion which is inclined from said one side to said the other side as the second tapered portion extends in the first direction.

When the molding device of the present invention has a plurality of rotation members, "first direction" is considered with respect to the individual fixing members. That is, when "a moving direction of the fixing member from the retracting position to the fixing position" differs for each fixing member, a different first direction is estimated for each fixing member (see first direction D1, D2 in Embodiment 1 described later).

The first tapered portion and the second tapered portion may have a planar shape or a curved shape.

[6] In the molding device according to the present invention (the molding device in the above configuration [4] or [5]), it is preferable that, assuming a moving direction of the fixing member from the retracting position to the fixing position as a first direction, the rotation member have a first projecting portion which projects from said the other side to said one side, the fixing member have a second projecting portion which projects from said one side to said the other side, a distal end of the first projecting portion be positioned on a more first direction side than a distal end of the second projecting portion when the fixing member is at the retracting position, and the distal end of the second projecting portion be positioned on a more first direction side than the distal end of the first projecting portion when the fixing member is at the fixing position, the first projecting portion have a third tapered portion which is inclined from said one side to said the other side as the third tapered portion extends toward the first direction on a first direction side, and the second projecting portion have a fourth tapered portion which is inclined from said one side to said the other side as the fourth tapered portion extends toward the first direction on a side opposite to the first direction side.

The third tapered portion and the fourth tapered portion may have a planar shape or a curved shape.

[7] In the molding device according to the present invention (the molding device in the above configuration [4]), it is preferable that, assuming a moving direction of the fixing member from the retracting position to the fixing position as a first direction, a plane perpendicular to the first direction as a reference plane, and an angle made by a plane and the reference plane which intersects with the plane as a reference inclination angle, the rotation member have a first tapered portion which is inclined from said one side to said the other side as the first tapered portion extends toward the first direction and a first projecting portion which projects from said the other side to said one side, the fixing member have a second tapered portion which is inclined from said one side to said the other side as the second tapered portion extends toward the first direction and a second projecting portion which projects from said one side to said the other side, a distal end of the first projecting portion be positioned on a more first direction side than a distal end of the second projecting portion when the fixing member is at the retracting position, and the distal end of the second projecting portion be positioned on a more first direction side than the distal end of the first projecting portion when the fixing member is at the fixing position, the first projecting portion have a third tapered portion which is inclined from said one side to said the other side as the third tapered portion extends toward the first direction on a first direction side and the second projecting portion have a fourth tapered portion which is inclined from said one side to said the other side as the fourth tapered portion extends toward the first direction on a side opposite to the first direction side, and the first tapered portion and the second tapered portion have reference inclination angles equal to or less than reference inclination angles of the third tapered portion and the fourth tapered portion.

Each tapered portion may have a planar shape or a curved shape. The reference inclination angle when each tapered portion has a curved shape is compared using the same reference plane.

[8] In the molding device according to the present invention (the molding device in the above configuration [6] or [7]), it is preferable that, the molding device further include a return prevention member which is configured to prevent the rotation member from returning to a position taken during molding after the rotation member is moved by the first projecting portion and the second projecting portion, and the return prevention member may be configured to prevent the rotation member from returning to the position taken during molding by entering a space formed by the movement of the rotation member after the rotation member is moved by the first projecting portion and the second projecting portion.

[9] In the molding device according to the present invention (the molding device in the above configurations [6] to [8]), it is preferable that, the molding device be a molding device for manufacturing a molded product made of metal as the molded product.

[10] A method for manufacturing a molded product according to the present invention is a method for manufacturing a molded product having an arc-shaped bent inner space, the method comprising: a first step of forming by molding the molded product between a pair of molds capable of forming a cavity which has a shape corresponding to an outer shape of the molded product in a joined state and a core which has a shape corresponding to an inner shape of the molded product; and a second step of, after forming by molding the molded product, pulling out the core from the molded product by rotating the core by a rotation member joined to a terminal end of the core in this order.

[11] In the method for manufacturing a molded product of the present invention, assuming a side where the cavity is formed during molding as viewed from a member disposed on a side closer to the rotation member than the cavity as one side, and assuming a side opposite to said one side as the other side, it is preferable that, in the second step, a first force which is directed from said one side to said the other side be applied to the rotation member first and, thereafter, a second force which is weaker than the first force and is a rotation force be applied to the rotation member thus pulling out the core from the molded product.

To carry out the method described in the above configuration [11], although any molding device can be used provided that the conditions described in the above configuration [11] is satisfied, it is preferable to use the molding devices described in the above configurations [6] to [8].

[12] In the method for manufacturing a molded product according to the present invention (the method for manufacturing a molded product in the above configuration [11]), it is preferable that the molded product be a molded product made of metal.

Advantageous Effects of Invention

According to the molding device of the present invention, the core can be pulled out from the molded product by rotating the core by the rotation member. Accordingly, compared to a case where the core is pulled out from the molded product with a linear pushing force generated by a pin, a pressure applied to the molded product at the time of pulling out the core can be reduced.

Accordingly, compared to a conventional molding device, the molding device of the present invention becomes a molding device capable of suppressing the occurrence of a defect on a molded product having an arc-shaped bent inner space at the time of taking out the molded product.

Further, according to the molding device of the present invention, the core is pulled out along an arc from a molded product due to the rotation of the core and the rotation member. Accordingly, resistance generated at the time of pulling out the core can be decreased and hence, the core can be smoothly pulled out. Eventually, the molded product can be smoothly taken out.

According to the method for manufacturing a molded product of the present invention, in the second step, the core is pulled out from the molded product by rotating the core by the rotation member. Accordingly, compared to a case where the core is pulled out from the molded product with a linear pushing force generated by a pin, a pressure applied to the molded product at the time of pulling out the core can be reduced.

Accordingly, compared to a method for manufacturing a molded product using a conventional molding device, the method for manufacturing a molded product of the present invention becomes a method for manufacturing a molded product capable of suppressing the occurrence of a defect on a molded product having an arc-shaped bent inner space at the time of taking out the molded product.

Further, according to the method for manufacturing a molded product of the present invention, in the second step, the core is pulled out along an arc from a molded product due to the rotation of the core and the rotation member. Accordingly, resistance generated at the time of pulling out the core can be decreased and hence, the core can be smoothly pulled out. Eventually, the molded product can be smoothly taken out.

BRIEF DESCRIPTION OF DRAWINGS

FIG. 2 is a flowchart of a method for manufacturing a molded product according to Embodiment 1.

FIG. 3A to FIG. 3C are views for describing a first step S10 in Embodiment 1.

DESCRIPTION OF EMBODIMENTS

Figure 1A:
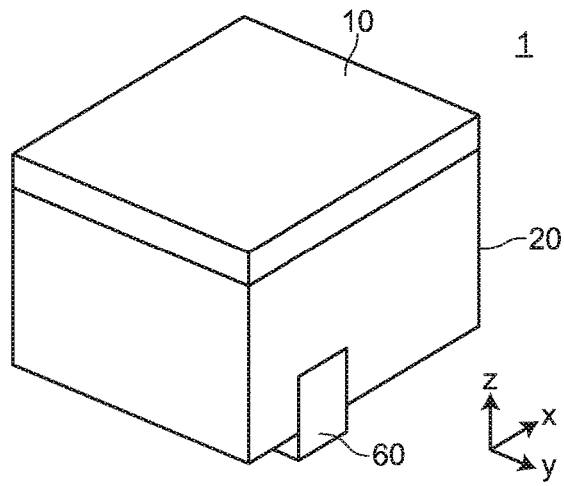
FIG. 1A to FIG. 1F are views showing a molding device 1 according to Embodiment 1.

Hereinafter, a molding device and a method for manufacturing a molded product according to the present invention are described based on embodiments. In this specification and respective drawings, among constitutional elements of an actual molding device, only the constitutional elements of the molding device closely relating to the present invention are described and illustrated, and the description and the illustration of the constitutional elements other than the closely relating constitutional elements (a drive device for moving a pair of molds) are basically omitted.

In the drawings which indicate molding mold, parts of the molding mold and a molded product, directions indicated in the drawings are expressed by three axes consisting of an x axis, a y axis and a z axis. The z axis is an axis parallel to a direction along which one pair of molds 10, 20 is stacked to each other, the x axis is an axis perpendicular to the z axis, and the y axis is an axis perpendicular to the x axis and the z axis.

The embodiments are described hereinafter on a premise that the z axis is defined as the stacking direction of the molds as described above in this specification. However, the present invention is not limited to such a case. The z axis may be defined differently without departing from the gist of the present invention.

All constitutional elements in the drawings which indicate the molding mold, the parts of the molding mold and a molded product are schematically described, and the indication of sizes and angles of these constitutional elements do not necessarily reflect actual sizes and angles.

Embodiment 1

Figure 1B:
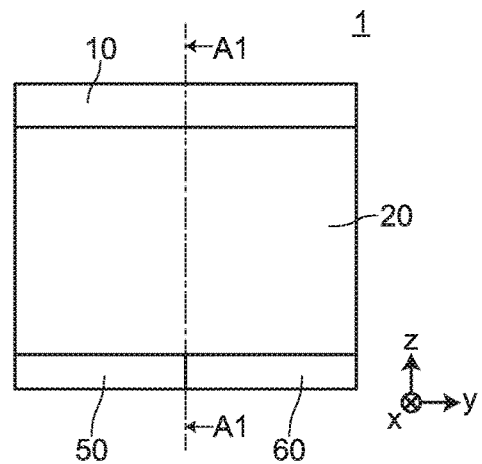
Figure 1C:
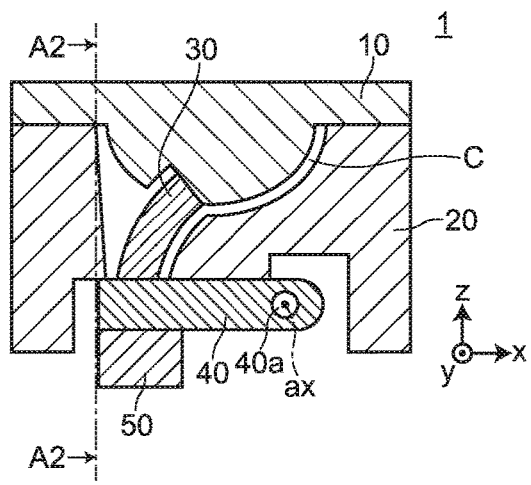
Figure 1D:
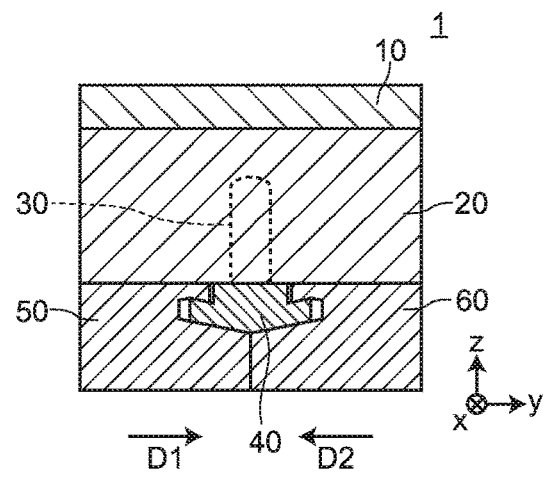
Figure 1E:
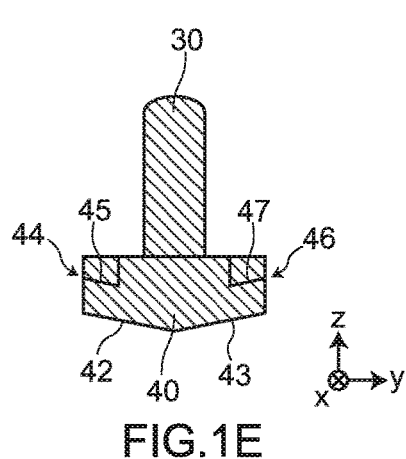
Figure 1F:
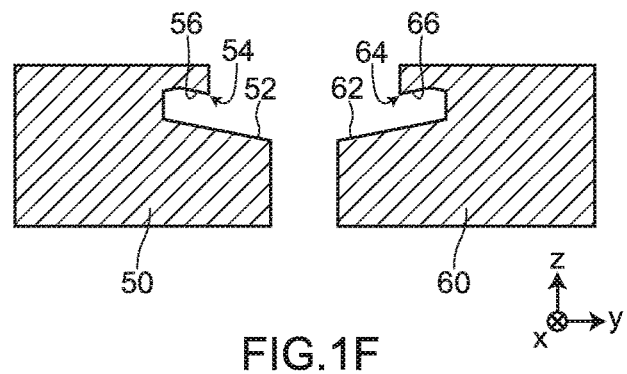

FIG. 1A to FIG. 1F are views showing a molding device 1 according to Embodiment 1. FIG. 1A is a perspective view of the molding device 1, FIG. 1B is a front view of the molding device 1, FIG. 1C is a cross-sectional view of the molding device 1 in FIG. 1B taken along a line A1-A1, FIG. 1D is a cross-sectional view of the molding device 1 in FIG. 1C taken along a line A2-A2, FIG. 1E is an enlarged cross-sectional view of a core 30 and a rotation member 40, and FIG. 1F is an enlarged cross-sectional view of fixing members 50, 60. Hereinafter, the cross-sectional view corresponding to FIG. 1C is referred to as a side cross-sectional view, and the cross-sectional view corresponding to FIG. 1D is referred to as a front cross-sectional view. FIG. 1E and FIG. 1F are enlarged cross-sectional views corresponding to the front cross-sectional view, and are provided for indicating symbols given to detailed parts of the respective parts. Although the core 30 is not visible by being concealed by the mold 20 in the front cross-sectional view such as FIG. 1D, the core 30 is indicated by a broken line.

FIG. 2 is a flowchart of a method for manufacturing a molded product according to Embodiment 1.

FIG. 3A to FIG. 3C are views for describing a first step S10 in Embodiment 1. FIG. 3A to FIG. 3C are step views.

FIG. 4A to FIG. 4F are views for describing a second step S20 in Embodiment 1. FIG. 4A to FIG. 4F are step views.

1. Configuration of Molding Device

First, the configuration of the molding device 1 according to Embodiment 1 is described. In the description made hereinafter, the molding device 1 is described by assuming a side where a cavity C is formed during molding as viewed from members disposed on a more rotation member 40 side than the cavity C (that is, the rotation member 40 and the fixing members 50, 60) as one side (an upper side in the drawing), and a side opposite to one side as the other side (a lower side in the drawing). The same definition is adopted in Embodiment 2 described later in the same manner.

The molding device 1 according to Embodiment 1 is a molding device for manufacturing a molded product P having an arc-shaped bent inner space (see a method for manufacturing a molded product described later). The molding device 1 is a molding device for manufacturing a molded product made of metal as the molded product P.

As shown in FIG. 1, the molding device 1 includes the pair of molds 10, 20, the core 30, the rotation member 40, and the fixing members 50, 60. Hereinafter, these constitutional elements are described.

The pair of molds 10, 20 is joinable to each other and separable from each other and is capable of forming the cavity C which has a shape corresponding to an outer shape of the molded product P in a joined state during molding (see FIG. 1C). The pair of molds 10, 20 according to Embodiment 1 is formed of a movable-side mold and a fixed-side mold.

In Embodiment 1, whether the mold which forms the pair of molds 10, 20 is a movable-side mold or a fixed-side mold does not relate to the gist of the present invention and hence, the description is made hereinafter without particularly differentiating the molds 10, 20 whether the pair of molds 10, 20 is a movable-side mold or a fixed-side mold.

The movable-side mold is movable in a vertical direction by a drive mechanism not shown in the drawings.

A medium flow passage through which a temperature adjusting medium (for example, water) flows may be formed in the inside of the pair of molds 10, 20.

The cavity C is larger than the rotation member 40 as viewed in a top plan view. Between the cavity C and the rotation member 40, a member which prevents the molded product P from being rotated together with the rotation member 40 is disposed. That is, such a member exists at a portion between the cavity C of the mold 20 and the rotation member 40.

The core 30 has a shape corresponding to an inner shape of the molded product P, and is arranged in the inside of the cavity C formed by the pair of molds 10, 20 during molding.

As the core 30, a core having a large removal gradient can be also used by taking into account an easy pullout of the core 30. Further, as the core 30, a core bent in a curved shape following an arc of an ellipse, a core bent following a shape formed by adding a straight line to an arc of a circle or the like may be also used.

A medium flow passage through which a temperature adjusting medium flows may be formed in the inside of the core 30.

Figure 4A:
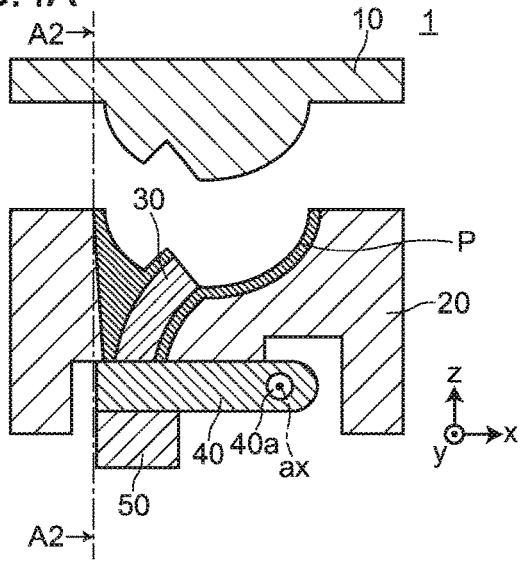
FIG. 4A to FIG. 4F are views for describing a second step S20 in Embodiment 1.
Figure 4B:
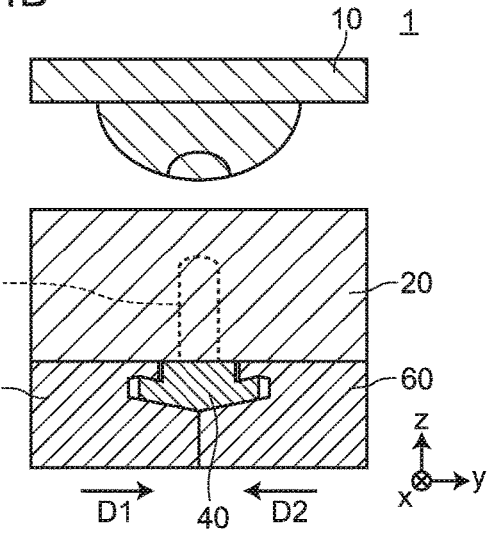
Figure 4C:
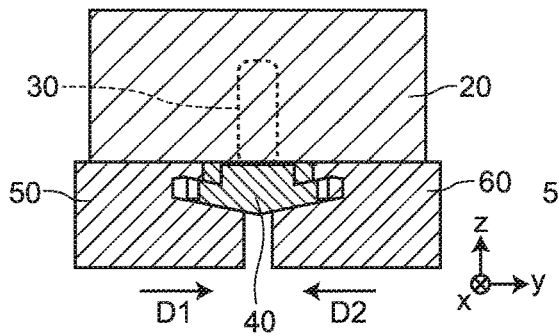

The rotation member 40 is joined to a terminal end of the core 30, and is rotatable together with the core 30 after molding (see FIG. 4E and FIG. 4F described later). The rotation member 40 is rotatable about a predetermined rotation axis ax perpendicular to an imaginary plane (a plane parallel to a plane which includes the x axis and the z axis in the drawing) along the arc as the center of rotation. In FIG. 1C and the like, symbol 40a indicates a shaft rod.

The core 30 and the rotation member 40 may be integrally formed with each other or may be formed as parts separate from each other. When the core 30 and the rotation member 40 are formed as parts separate from each other, the core 30 and the rotation member 40 may be non-removably joined to each other or may be removably joined to each other.

In Embodiment 1, the rotation member 40 is mounted on the mold 20.

The rotation member 40 may be in contact with the cavity C. (The rotation member 40 may forma portion of an outer shape of the cavity C. The rotation member 40 is described in such a manner in FIG. 1C.) The rotation member 40 may be spaced apart from the cavity C.

A medium flow passage through which a temperature adjusting medium flows may be formed in the inside of the rotation member 40.

The rotation member 40 can be rotated by a rotating mechanism (not shown in the drawing) which rotates the rotation member 40, for example. As the rotating mechanism, it is possible to use various kinds of mechanisms such as, for example, a rack-and-pinion, various motors and various link mechanisms. Further, the rotating mechanism may be a handle or the like for manually rotating the rotation member 40.

As shown in FIG. 1E, the rotation member 40 has first tapered portions 42, 43 and first projecting portions 44, 46.

The first tapered portion 42 is inclined from one side (upper side) to the other side (lower side) as the first tapered portion 42 extends in a first direction D1. The first tapered portion 43 is inclined from one side to the other side as the first tapered portion 43 extends in a first direction D2.

The first projecting portions 44, 46 project from the other side to one side. The first projecting portion 44 has a third tapered portion 45 which is inclined from one side to the other side as the third tapered portion 45 extends toward the first direction D1 on a first direction D1 side. The first projecting portion 46 has a third tapered portion 47 which is inclined from one side to the other side as the third tapered portion 47 extends toward the first direction D2 on a first direction D2 side.

The fixing members 50, 60 can fix the rotation member 40. To be more specific, the fixing members 50, 60 fix the core 30 and the rotation member 40 by supporting the rotation member 40 from the other side during molding (see FIG. 1D and FIG. 3B described later), and the fixing members 50, 60 allow the rotation member 40 to be rotatable by retracting from the other side of the rotation member 40 after molding (see FIG. 4D described later).

The molding device 1 may further include a member (not shown in the drawings) which supports the fixing members 50, 60 from the other side.

Assuming a position where the fixing members 50, 60 are arranged when the core 30 is pulled out from the molded product P as retracting position (the position of the fixing members 50, 60 in FIG. 4D) and assuming a position where the fixing members 50, 60 are arranged during molding as fixing position (the position of the fixing members 50, 60 in FIG. 1D and FIG. 3B), the fixing members 50, 60 are movable linearly (in other words, one-dimensionally) between the retracting position and the fixing position.

As viewed from a position where the retracting position and the fixing position overlap with each other (for example, as viewed from a viewpoint shown in FIG. 1C), a positional relationship between the retracting position and the fixing position of the fixing members 50, 60 and the rotation member 40 during molding (in Embodiment 1, a vertical distance between the retracting position and the fixing position of the fixing members 50, 60 and the rotation member 40 during molding) is not changed even when the fixing members 50, 60 take either the retracting position or the fixing position.

The fixing members 50, 60 can be moved by using, for example, a singular pin, various cylinders or the like fixed to the fixed-side mold.

Assume a moving direction of the fixing member 50 from the retracting position to the fixing position as the first direction D1, and assume a moving direction of the fixing member 60 from the retracting position to the fixing position as the first direction D2. The moving direction of the fixing member 50 from the retracting position to the fixing position is just opposite to the moving direction of the fixing member 60 from the retracting position to the fixing position. The first directions D1, D2 in Embodiment 1 are directions parallel to the rotation axis ax.

As shown in FIG. 1F, the fixing member 50 has a second tapered portion 52 which is inclined from one side to the other side as the second tapered portion 52 extends toward the first direction D1 and a second projecting portion 54 which projects from one side to the other side. The fixing member 60 has a second tapered portion 62 which is inclined from one side to the other side as the second tapered portion 62 extends toward the first direction D2 and a second projecting portion 64 which projects from one side to the other side. In this embodiment, the second tapered portion 52 corresponds to the first tapered portion 42, the second tapered portion 62 corresponds to the first tapered portion 43, the second projecting portion 54 corresponds to the first projecting portion 44, and the second projecting portion 64 corresponds to the first projecting portion 46.

The second projecting portion 54 has a fourth tapered portion 56 inclined from one side to the other side as the fourth tapered portion 56 extends toward the first direction D1 on a side opposite to a first direction D1 side. The second projecting portion 64 has a fourth tapered portion 66 inclined from one side to the other side as the fourth tapered portion 66 extends toward the first direction D2 on a side opposite to a first direction D2 side.

Figure 4D:
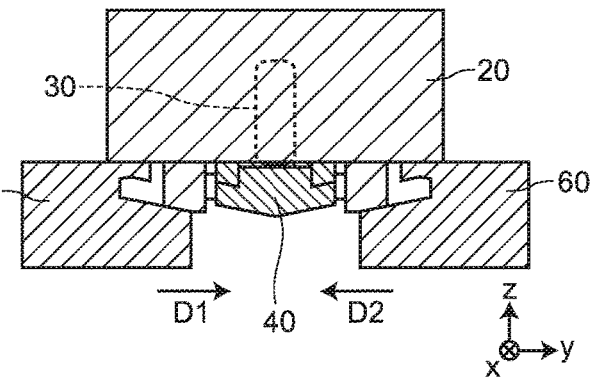
Figure 4E:
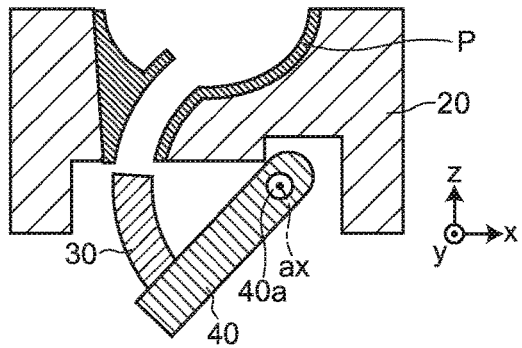
Figure 4F:
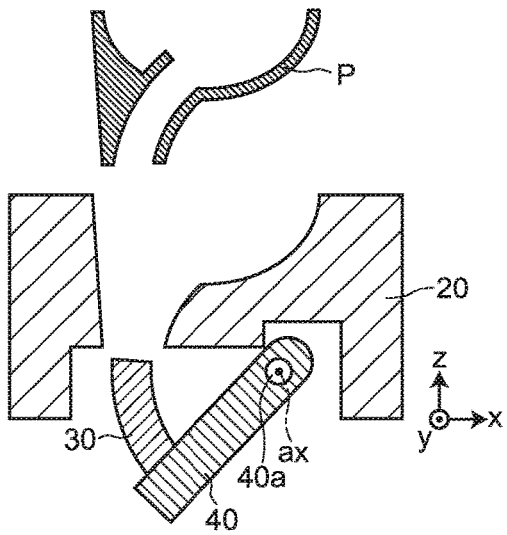

A distal end of the first projecting portion 44 is positioned on a more first direction D1 side than a distal end of the second projecting portion 54 when the fixing member 50 is at the retracting position, and the distal end of the first projecting portion 46 is positioned on a more first direction D2 side than the distal end of the second projecting portion 64 when the fixing member 60 is at the retracting position (see FIG. 1E, FIG. 1F and FIG. 4D).

On the other hand, the distal end of the second projecting portion 54 is positioned on a more first direction D1 side than the distal end of the first projecting portion 44 when the fixing member 50 is at the fixing position, and the distal end of the second projecting portion 64 is positioned on a more first direction D2 side than the distal end of the first projecting portion 46 when the fixing member 60 is at the fixing position (see FIG. 1D, FIG. 1E, FIG. 1F and FIG. 3B).

In this specification, assume a plane perpendicular to the first directions D1, D2 (a plane parallel to a plane which includes the x axis and the z axis in the drawings, for example, a plane where the fixing member 50 and the fixing member 60 opposedly face each other or are brought into contact with each other when the fixing members 50, 60 are at a fixing position in FIG. 1D) as a reference plane, and assume an angle at which a certain plane intersects with the reference plane as a reference inclination angle. In this case, the first tapered portions 42, 43 and the second tapered portions 52, 62 have the reference inclination angles equal to or less than the reference inclination angles of the third tapered portions 45, 47 and the fourth tapered portions 56, 66.

The first tapered portion 42, the second tapered portion 52, the third tapered portion 45 and the fourth tapered portion 56 have portions which can set the same reference plane. The first tapered portion 43, the second tapered portion 62, the third tapered portion 47 and the fourth tapered portion 66 also have portions which can set the same reference plane.

Provided that the above-mentioned conditions are satisfied, all of the first tapered portions 42, 43 and the second tapered portions 52, 62 may have the same reference inclination angle or may have reference inclination angles different from each other. The same goes for the third tapered portions 45, 47 and the fourth tapered portions 56, 66.

Although only for an exemplifying purpose, the reference inclination angles of the first tapered portions and the second tapered portions may be set to an angle which falls within a range of from 55 to 60°, and the reference inclination angles of the third tapered portions and the fourth tapered portions may be set to an angle which falls within a range of from 65 to 70°.

Although the description using drawings is omitted, a rounding (so-called an R portion) may be applied to portions which form corners of terminal ends of the respective constitutional elements including the respective tapered portions.

2. Method for Manufacturing Molded Product

Next, the method for manufacturing a molded product according to Embodiment 1 is described.

The method for manufacturing a molded product according to Embodiment 1 is a method for manufacturing a molded product P having an arc-shaped bent inner space. The method for manufacturing a molded product according to Embodiment 1 is performed using the molding device according to Embodiment 1. Accordingly, the molded product P is a molded product made of metal.

As shown in FIG. 2, the method for manufacturing a molded product according to Embodiment 1 includes a first step S10 and a second step S20 in this order. Hereinafter, the respective steps are described.

In FIG. 3A to FIG. 4F, because of space limitation on the paper on which these drawings are depicted, symbols for indicating the first projecting portions 44, 46, the second projecting portions 54, 64, the first tapered portions 42, 43, the second tapered portions 52, 62, the third tapered portions 45, 47 and the fourth tapered portions 56, 66 are omitted. See FIG. 1E and FIG. 1F with respect to these symbols.

As shown in FIG. 3A to FIG. 3C, the first step S10 is a step where a molded product P is formed by molding between the pair of molds 10, 20 capable of forming a cavity C which has a shape corresponding to an outer shape of the molded product P in a joined state and the core 30 which has a shape corresponding to an inner shape of the molded product P. To further explain the first step S10, the following operations are performed in step S10.

First, the pair of molds 10, 20 is joined to each other, and the rotation member 40 is rotated by the rotating mechanism so as to arrange the core 30 in the inside of the cavity C (see FIG. 3A and FIG. 3B). Although not shown in the drawing, the rotation member 40 is brought into a state where the rotation member 40 is slightly lower than a position which the rotation member 40 takes during molding thus preventing the interference between the first projecting portions 44, 46 and the second projecting portions 54, 64. By moving the fixing members 50, 60 along the first directions D1, D2 in such a state, the fixing members 50, 60 can be arranged at fixing position. At this stage of operation, the first tapered portions 42, 43 and the second tapered portions 52, 62 are brought into contact with each other so that the rotation member 40 is pushed up and the rotation member 40 is firmly fixed at the position which the rotation member 40 takes during molding. Then, a molten molding material is introduced into the cavity C and is solidified so that a molded product P is molded (see FIG. 3C).

As shown in FIG. 4A to FIG. 4F, the second step S20 is a step of, after forming by molding the molded product P, pulling out the core 30 from the molded product P by rotating the core 30 by the rotation member 40 joined to a terminal end of the core 30.

In the second step S20, a first force which is directed from one side to the other side is applied to the rotation member 40 first and, thereafter, a second force which is weaker than the first force and is a rotation force is applied to the rotation member 40 thus pulling out the core 30 from the molded product P. To further explain the second step S20, the following operations are performed in step S20.

First, the pair of molds 10, 20 is separated from each other (see FIG. 4A and FIG. 4B). After the molds 10, 20 are separated from each other, the fixing members 50, 60 are moved from a fixing position to a retracting position by parallel movement (see FIG. 4C and FIG. 4D). At this stage of operation, the third tapered portions 45, 47 of the first projecting portions 44, 46 and the fourth tapered portions 56, 66 of the second projecting portions 54, 64 slide from each other, and the fixing members 50, 60 continuously move in directions opposite to the first directions D1, D2. Accordingly, a first force which is directed from one side to the other side is applied to the rotation member 40 so that the core 30 is strongly peeled off from the molded product P (see FIG. 4C). Then, the rotation member 40 is rotated by applying a second force by the rotating mechanism so that the core 30 is pulled out from the molded product P (see FIG. 4E) and, thereafter, the molded product P is taken out (see FIG. 4F). The takeout of the molded product P can be performed using a robot hand or the like.

3. Advantageous Effects Acquired by Molding Device and Method for Manufacturing a Molded Product According to Embodiment 1

Hereinafter, advantageous effects acquired by the molding device 1 and the method for manufacturing a molded product according to Embodiment 1 are described.

According to the molding device 1 of Embodiment 1, the core 30 can be pulled out from the molded product P by rotating the core 30 by the rotation member 40. Accordingly, compared to a case where the core is pulled out from the molded product with a linear pushing force generated by a pin, a pressure applied to the molded product at the time of pulling out the core can be reduced.

Accordingly, compared to a conventional molding device, the molding device 1 of Embodiment 1 becomes a molding device capable of suppressing the occurrence of a defect on a molded product having an arc-shaped bent inner space at the time of taking out the molded product.

Further, according to the molding device 1 of Embodiment 1, the core 30 is pulled out along an arc from the molded product P due to the rotation of the core 30 and the rotation member 40. Accordingly, resistance generated at the time of pulling out the core can be decreased and hence, the core can be smoothly pulled out. Eventually, the molded product can be smoothly taken out.

According to the molding device 1 of Embodiment 1, the rotation member 40 is rotatable about the predetermined rotation axis ax perpendicular to the imaginary plane along the arc as the center of rotation. Accordingly, the core can be pulled out with simple rotation using an axis of rotation as a center axis.

According to the molding device 1 of Embodiment 1, the molding device 1 further includes the fixing members 50, 60. The fixing members 50, 60 fix the core 30 and the rotation member 40 by supporting the rotation member 40 from the other side during molding, and the fixing member allows the rotation member 40 to be rotatable by retracting from the other side of the rotation member 40 after molding. Accordingly, stable molding can be performed by sufficiently suppressing the rotation of the rotation member during molding.

According to the molding device 1 of Embodiment 1, the molding device 1 includes the fixing members 50, 60 and hence, it is possible to prevent a load from being applied to a mechanism for rotating the rotation member during molding.

According to the molding device 1 of Embodiment 1, the fixing members 50, 60 are movable linearly between the retracting position and the fixing position. Accordingly, by setting a simple moving direction, various moving units (an angular pin, a hydraulic cylinder, a pneumatic cylinder and the like) can be used.

According to the molding device 1 of Embodiment 1, the rotation member 40 has the first tapered portions 42, 43, and the fixing members 50, 60 have the second tapered portions 52, 62. Accordingly, by pushing the rotation member along the tapers, the fixing members can be smoothly arranged at the fixing position whereby a molding cycle can be enhanced.

According to the molding device 1 of Embodiment 1, the rotation member 40 has the first projecting portions 44, 46, and the fixing members 50, 60 have the second projecting portions 54, 64. Accordingly, even when the molded product and the core are adhered to each other, it is possible to separate the molded product and the core from each other.

According to the molding device 1 of Embodiment 1, the first projecting portion 44 has the third tapered portion 45 on the first direction D1 side and the second projecting portion 54 has the fourth tapered portion 56 on a side opposite to the first direction D1 side. Accordingly, it is possible to convert force used for moving the fixing member into a force for separating the molded product and the core from each other. In the same manner, the first projecting portion 46 has the third tapered portion 47 on the first direction D2 side and the second projecting portion 64 has the fourth tapered portion on a side opposite to the first direction D2 side. Accordingly, it is possible to convert force used for moving the fixing member into a force for separating the molded product and the core from each other.

According to the molding device 1 of Embodiment 1, the first tapered portions 42, 43 and the second tapered portions 52, 62 have the reference inclination angles equal to or less than the reference inclination angles of the third tapered portions 45, 47 and the fourth tapered portions 56, 66. Accordingly, in the movement of the fixing members from the fixing position to the retracting position and in the movement of the fixing member from the retracting position to the fixing position, the interference between the fixing members and the rotation member can be reduced or prevented.

According to the molding device 1 of Embodiment 1, the molding device 1 is a molding device for manufacturing a molded product made of metal as a molded product P, and has the above-mentioned technical features suitable for the manufacture of a molded product made of metal. Accordingly, even when the molded product and the core are strongly adhered to each other due to a shrinking force (catching force) of metal, the molded product and the core can be separated from each other by the above-mentioned mechanism.

According to the method for manufacturing a molded product of Embodiment 1, in the second step S20, the core 30 is pulled out from the molded product P by rotating the core 30 by the rotation member 40. Accordingly, compared to a case where the core is pulled out from the molded product with a linear pushing force generated by a pin, a pressure applied to the molded product at the time of pulling out the core can be reduced.

Accordingly, compared to a method for manufacturing a molded product using a conventional molding device, the method for manufacturing a molded product of Embodiment 1 becomes a method for manufacturing a molded product capable of suppressing the occurrence of a defect on a molded product having an arc-shaped bent inner space at the time of taking out the molded product.

Further, according to the method for manufacturing a molded product of Embodiment 1, in the second step S20, the core 30 is pulled out along an arc from a molded product P due to the rotation of the core 30 and the rotation member 40. Accordingly, resistance generated at the time of pulling out the core can be decreased and hence, the core can be smoothly pulled out. Eventually, the molded product can be smoothly taken out.

According to the method for manufacturing a molded product of Embodiment 1, in the second step S20, a first force is applied to the rotation member 40 first and, thereafter, a second force which is weaker than the first force and is a rotation force is applied to the rotation member 40 thus pulling out the core 30 from the molded product P. Accordingly, even when the molded product and the core are adhered to each other, the molded product can be smoothly taken out by easily separating the molded product and the core from each other.

According to the method for manufacturing a molded product of Embodiment 1, the molded product P is a molded product made of metal. Accordingly, even when the molded product and the core are strongly adhered to each other due to a shrinking force (catching force) of metal, the molded product and the core can be separated from each other by the above-mentioned method.

Embodiment 2

Figure 5A:
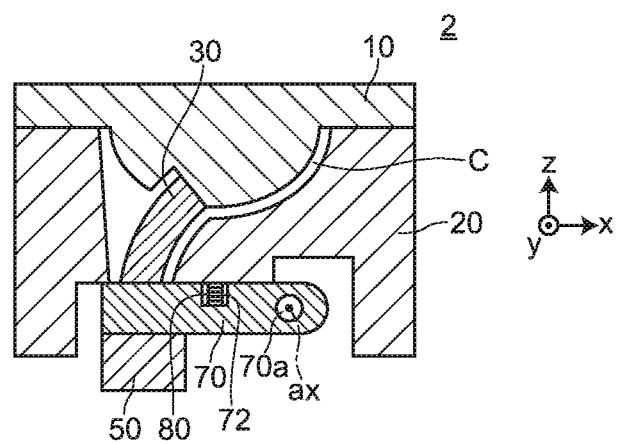
FIG. 5A and FIG. 5B are cross-sectional views of a molding device 2 according to Embodiment 2.
Figure 5B:
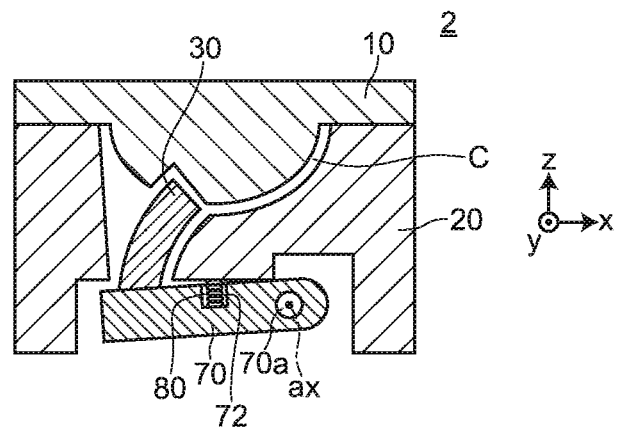

FIG. 5A and FIG. 5B are cross-sectional views of a molding device 2 according to Embodiment 2. FIG. 5A is a side cross-sectional view of the molding device 2 during molding (first step S10), and FIG. 5B is a side cross-sectional view of the molding device 2 in a state where distal ends of first projecting portions 44, 46 and distal ends of second projecting portions 54, 64 are brought into contact with each other after molding (corresponding to FIG. 4C).

The molding device 2 according to Embodiment 2 has substantially the same configuration as the molding device 1 according to Embodiment 1. However, the molding device 2 according to Embodiment 2 differs from the molding device 1 according to Embodiment 1 with respect to a point that the molding device 2 has a return prevention member.

As shown in FIG. 5A and FIG. 5B, the molding device 2 according to Embodiment 2 further includes a return prevention member 80 which prevents a rotation member 70 from returning to a position taken during molding after the rotation member 70 is moved by the first projecting portions 44, 46 and the second projecting portions 54, 64.

The return prevention member 80 prevents the rotation member 70 from returning to the position taken during molding by entering a space formed by the movement of the rotation member 70 after the rotation member 70 is moved by the first projecting portions 44, 46 and the second projecting portions 54, 64.

In the embodiment 2, one end of the return prevention member 80 is fixed to a bottom surface of an accommodating portion 72 formed in the rotation member 70 in Embodiment 2. The rotation member 70 has substantially the same configuration as the rotation member 40 of Embodiment 1 except that the rotation member 70 has the accommodating portion 72.

The return prevention member 80 is formed of an elastic member. To be more specific, the return prevention member is a coil spring (spring) made of metal. During molding, the return prevention member 80 is pressed and shrunken by a fixing force or the like of the fixing members 50, 60 (see FIG. 5A). After molding, when the rotation member 70 is moved by the first projecting portions 44, 46 and the second projecting portions 54, 64, the return prevention member 80 extends and enters a space formed by the movement of the rotation member 70.

In Embodiment 1, the return prevention member 80 also functions as a spacer for slightly lowering the rotation member 70 than a position which the rotation member 70 takes during molding at the time of starting new molding. With such a configuration, the interference between the first projecting portions and the second projecting portions can be avoided and hence, a next molding step can be performed smoothly.

As described above, the molding device 2 according to Embodiment 2 differs from the case of the molding device 1 according to Embodiment 1 with respect to a point that the molding device 2 has the return prevention member. However, in the same manner as the molding device 1 according to Embodiment 1, the core can be pulled out from the molded product by rotating the core by the rotation member. Accordingly, compared to a case where the core is pulled out from the molded product with a linear pushing force generated by a pin, a pressure applied to the molded product at the time of pulling out the core can be reduced.

Accordingly, compared to a conventional molding device, the molding device 2 of Embodiment 2 also becomes a molding device capable of suppressing the occurrence of a defect on a molded product having an arc-shaped bent inner space at the time of taking out the molded product.

In the embodiment 2, the molding device 2 further includes the return prevention member 80 and hence, it is possible to prevent the rotation member from returning to the position taken during molding after molding. Accordingly, it is possible to prevent the molded product and the core from being adhered to each other again by a molding material in the course of cooling.

The molding device 2 according to Embodiment 2 has substantially the same configuration as the molding device 1 according to Embodiment 1 and hence, the molding device 2 according to Embodiment 2 also directly has advantageous effects which the molding device 1 according to Embodiment 1 has.

Although the present invention has been described in conjunction with the above-mentioned respective embodiments heretofore, the present invention is not limited to the above-mentioned respective embodiments. Various modes of the present invention can be carried out without departing from the gist of the present invention. For example, the following modifications are also conceivable.

(1) In the molding devices described in the above-mentioned respective embodiments, the number, materials, shapes, positions, sizes and the like of the constitutional elements are provided for an exemplifying purpose, and these matters can be changed within a range where advantageous effects of the present invention are not impaired.

Figure 6A:
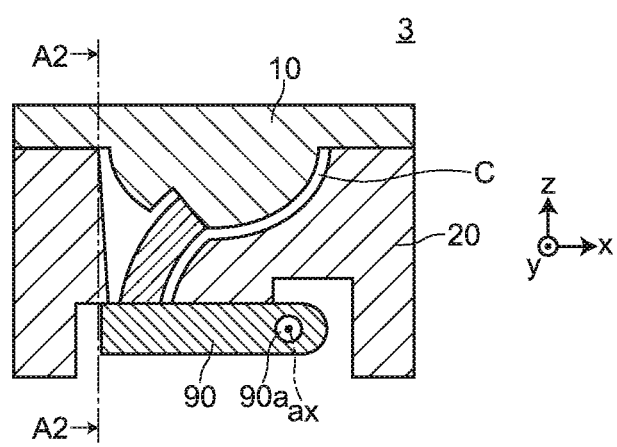
FIG. 6A to FIG. 6B are cross-sectional views of a molding device 3 according to Modification 1.
Figure 6B:
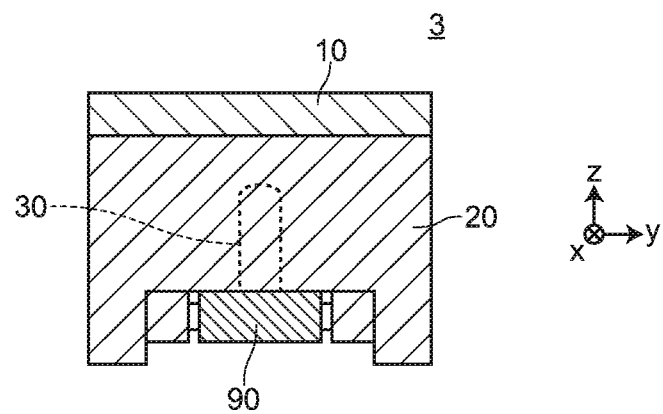
Figure 7A:
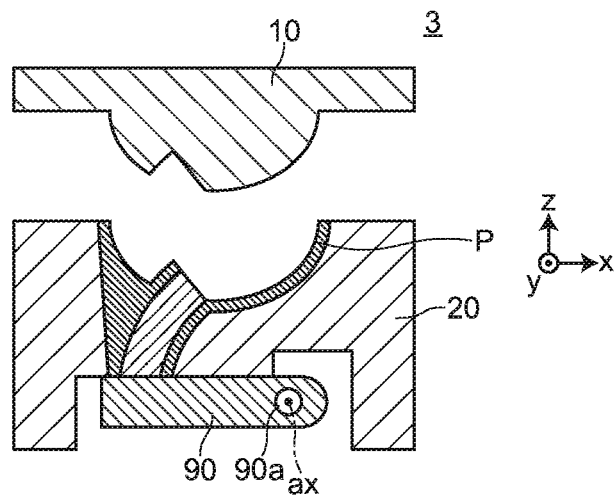
FIG. 7A to FIG. 7C are views for describing a method for manufacturing a molded product according to Modification 1.
Figure 7B:
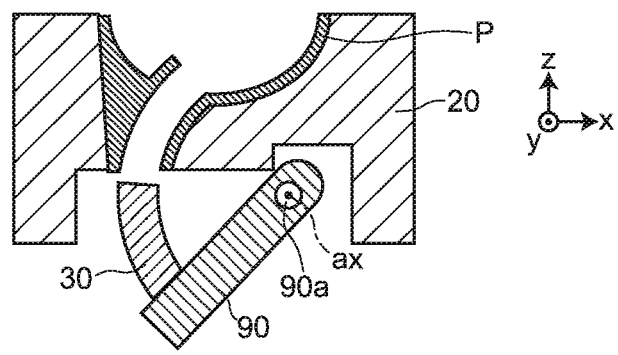
Figure 7C:
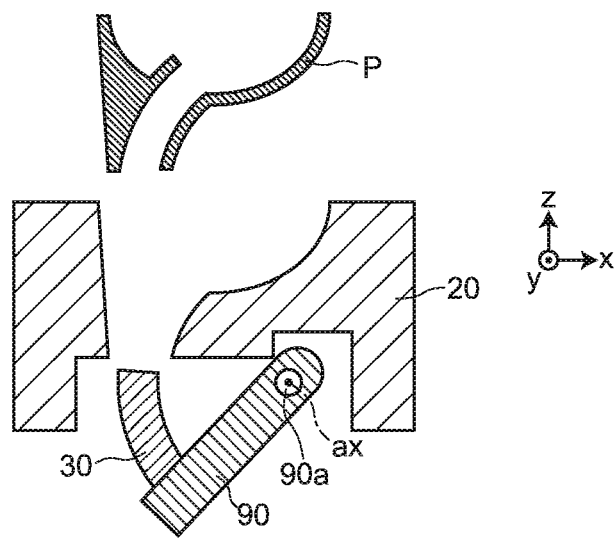

(2) FIG. 6A and FIG. 6B are cross-sectional views of a molding device 3 according to Modification 1. FIG. 6A is a side cross-sectional view of the molding device 3, and FIG. 6B is a front cross-sectional view of the molding device 3. Symbol 90 indicates a rotation member. FIG. 7A to FIG. 7C are views for describing a method for manufacturing a molded product according to Modification 1. FIG. 7A to FIG. 7C are step views showing a second step. As shown in FIG. 6A and FIG. 6B, the molding device according to the present invention may not include a fixing member. For example, by performing a control where a first force is applied to a rotation member 90 and, thereafter, a second force which is weaker than the first force and is a rotation force is applied to the rotation member 90, even when the molded product and the core are adhered to each other, the molded product and the core can be easily separated from each other so that the molded product can be smoothly taken out in the same manner as Embodiment 1. In Modification 1, as shown in FIG. 7A to FIG. 7C, the molded product can be manufactured substantially in the same manner as the method described in the above-mentioned Embodiment 1 except for matters relating to the fixing member.

Figure 8A:
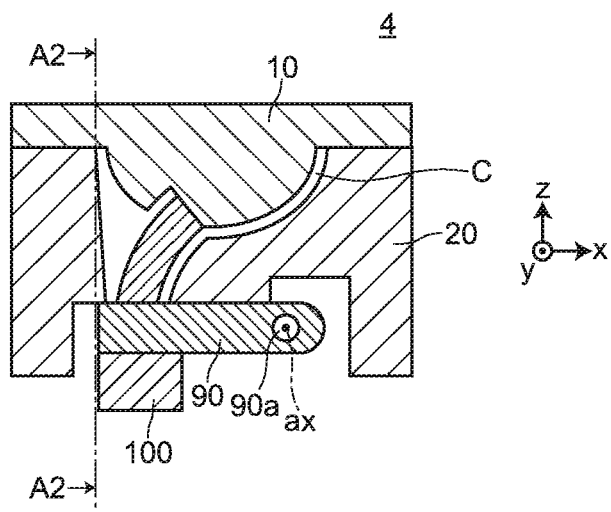
FIG. 8A to FIG. 8C are cross-sectional views of a molding device 4 according to Modification 2.
Figure 8B:
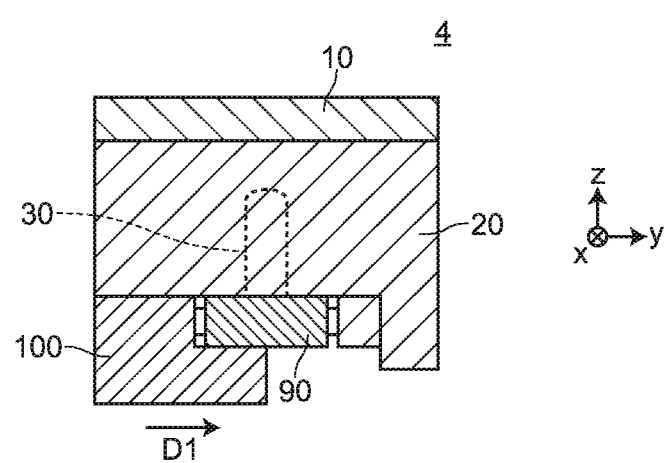
Figure 8C:
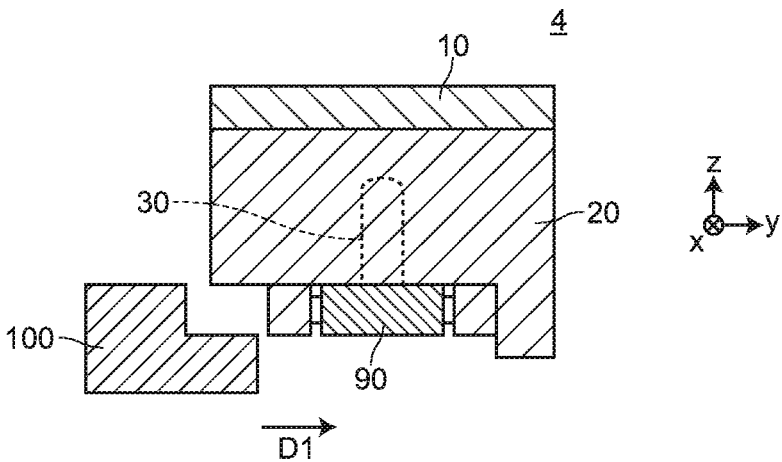
Figure 9A:
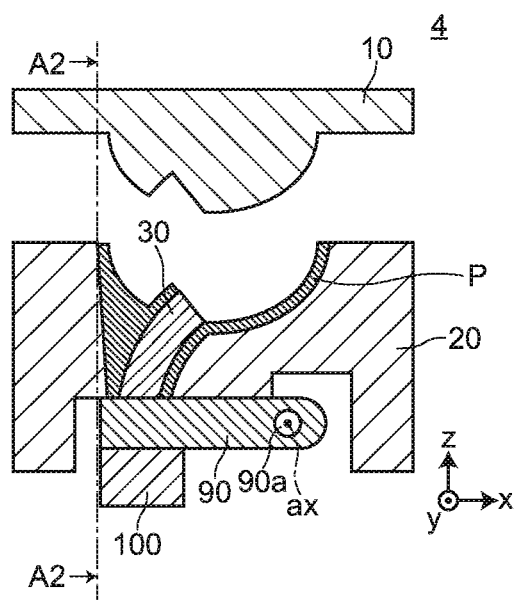
FIG. 9A to FIG. 9D are views for describing a method for manufacturing a molded product according to Modification 2.
Figure 9B:
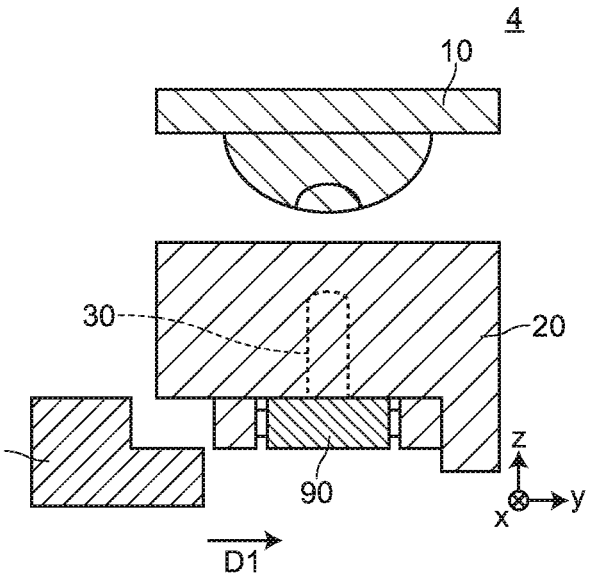
Figure 9C:
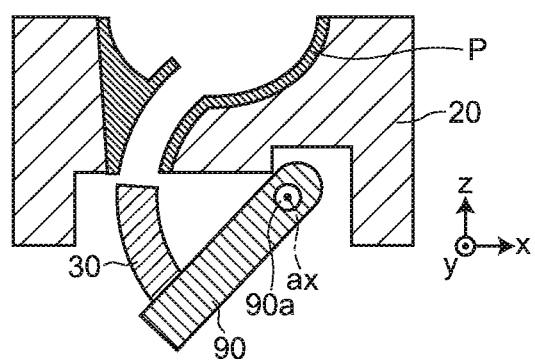
Figure 9D:
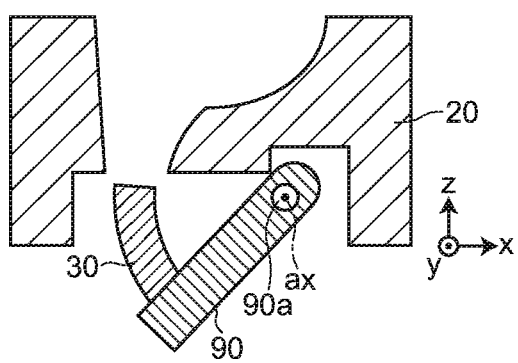

(3) FIG. 8A to FIG. 8C are cross-sectional views of a molding device 4 according to Modification 2. FIG. 8A is a side cross-sectional view of the molding device 4, FIG. 8B is a front cross-sectional view of the molding device 4 where a fixing member 100 is at a fixing position, and FIG. 8C is a front cross-sectional view of the molding device 4 where the fixing member 100 is at a retracting position. FIG. 9A to FIG. 9D are views for describing a method for manufacturing a molded product according to Modification 2. FIG. 9A to FIG. 9D are step views showing a second step. As shown in FIG. 8A to FIG. 8C, the molding device according to the present invention may include only one fixing member. In this case, as shown in FIG. 8A to FIG. 8C, a molded product can be manufactured substantially in the same manner as the case where the molding device includes the plurality of fixing members. Even when the molding device includes one fixing member, a projecting portion and a tapered portion may be formed on the fixing member in the same manner as Embodiment 1.

Figure 10A:
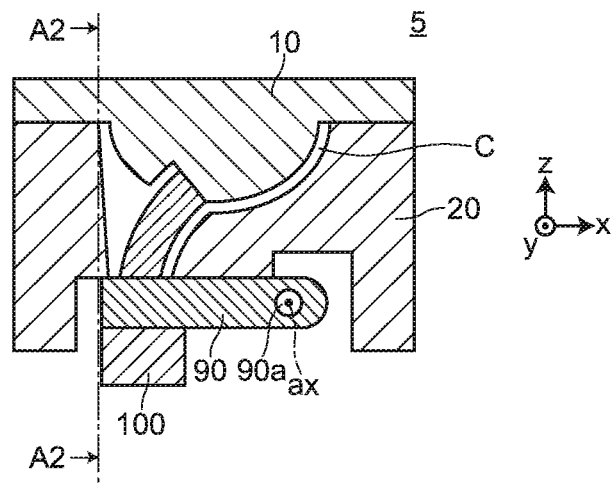
FIG. 10A to FIG. 10C are cross-sectional views of a molding device 5 according to Modification 3.
Figure 10B:
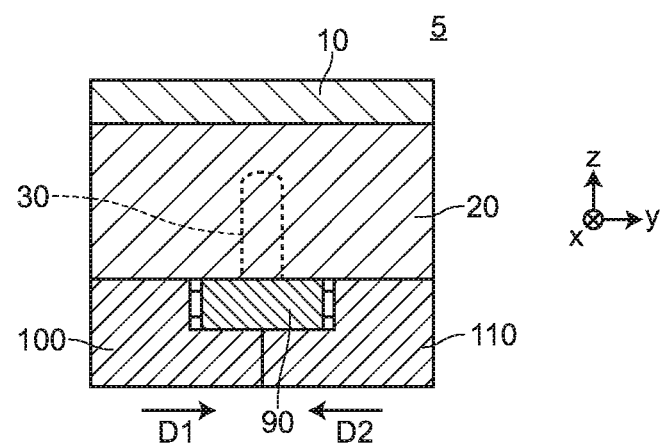
Figure 10C:
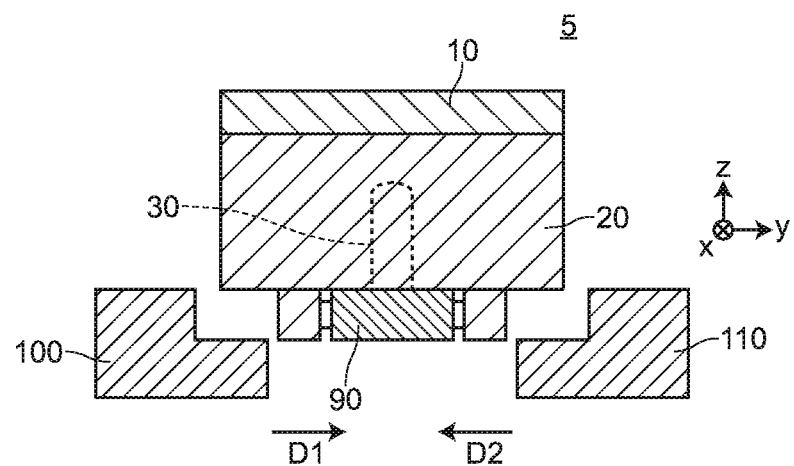

(4) FIG. 10A to FIG. 10C are cross-sectional views of a molding device 5 according to Modification 3. FIG. 10A is a side cross-sectional view of the molding device 5, FIG. 10B is a front cross-sectional view of the molding device 5 where fixing members 100, 110 are at a fixing position, and FIG. 10C is a front cross-sectional view of the molding device 5 where the fixing members 100, 110 are at a retracting position. As shown in FIG. 10A to FIG. 10C, the molding device according to the present invention may not have projecting portions and tapered portions.

Figure 11A:
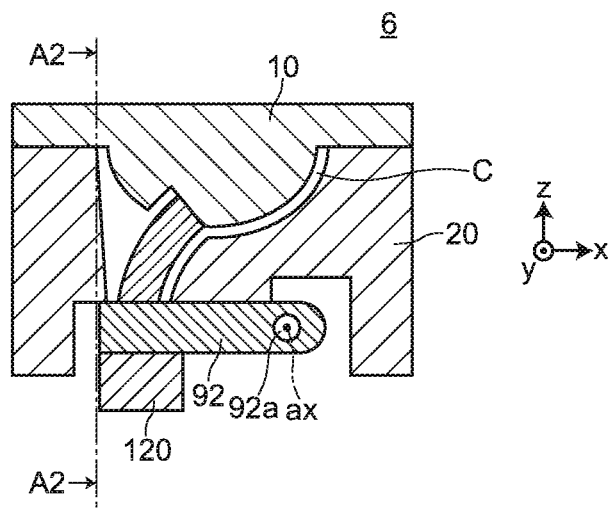
FIG. 11A and FIG. 11B are cross-sectional views of a molding device 6 according to Modification 4.
Figure 11B:
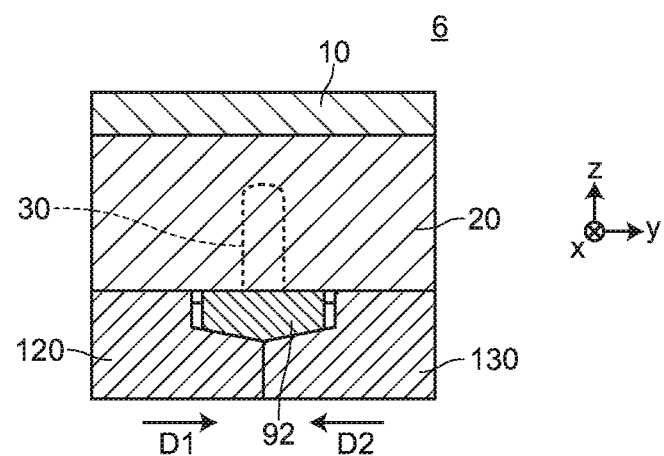

(5) FIG. 11A and FIG. 11B are cross-sectional views of a molding device 6 according to Modification 4. FIG. 11A is a side cross-sectional view of the molding device 6, FIG. 11B is a front cross-sectional view of the molding device 6. Symbol 92 indicates a rotation member. As shown in FIG. 11A and FIG. 11B, the molding device according to the present invention may not have projecting portions. The molding device according to the present invention may also not have first tapered portions and second tapered portions (not shown in the drawings).

Figure 12A:
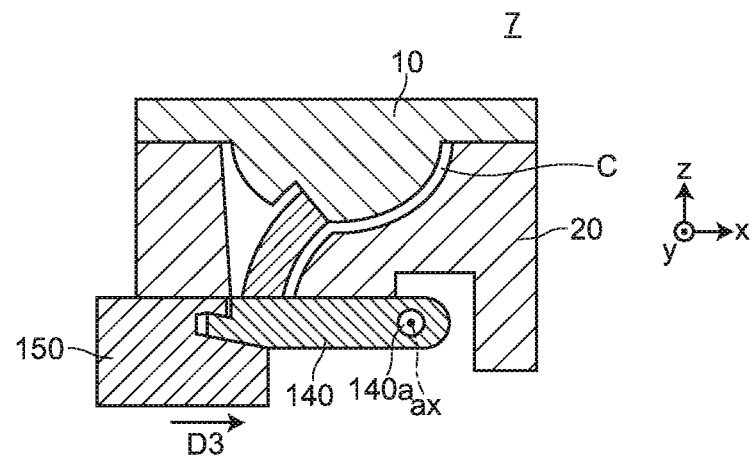
FIG. 12A and FIG. 12B are cross-sectional views of a molding device 7 according to Modification 5.
Figure 12B:
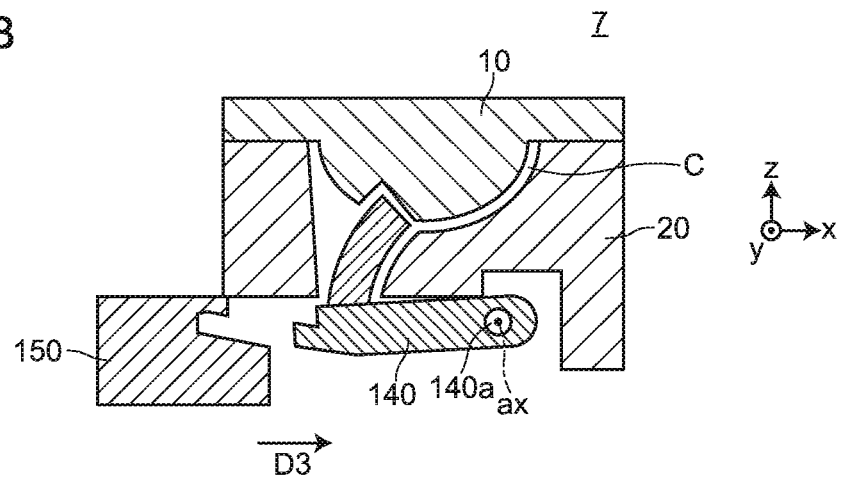
Figure 13A:
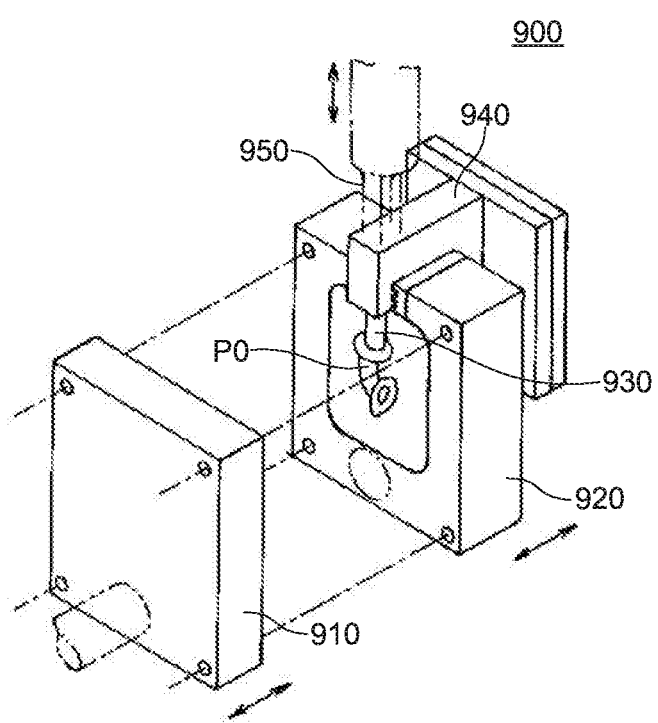
FIG. 13A and FIG. 13B are views for describing a conventional molding device 900.
Figure 13B:
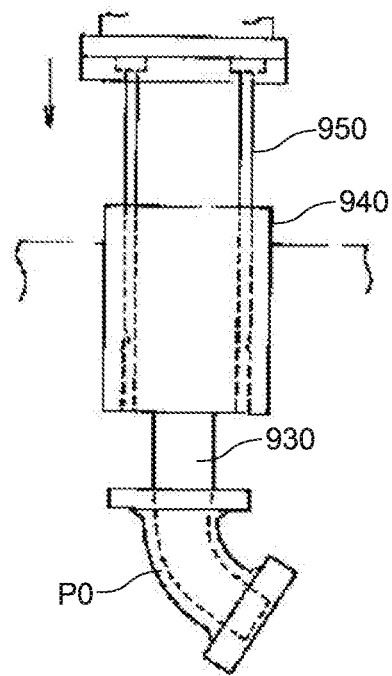

(6) FIG. 12A and FIG. 12B are cross-sectional views of a molding device 7 according to Modification 5. FIG. 12A is a side cross-sectional view of the molding device 7 where a fixing member 150 is at a fixing position, and FIG. 12B is a side cross-sectional view of the molding device 7 where the fixing member 150 is at a retracting position. Symbol 140 indicates a rotation member. As shown in FIG. 12A and FIG. 12B, the molding device according to the present invention may differ from Embodiment 1 or the like with respect to a moving direction of the fixing member. Further, the fixing member may be moved in a vertical direction or may be moved in a rotating manner (not shown in the drawings).

(7) In the above-mentioned respective embodiments and respective modifications, the molding device includes only a pair of molds 10, 20 as the mold. However, the present invention is not limited to such a configuration. The molding device may include a pair of molds which differ from the pair of molds 10, 20 in a direction that the molds are separated from each other. The molding device may further include a mold besides a pair of molds.

(8) In the above-mentioned respective embodiments and respective modifications, the rotation member is mounted on the mold 20. However, the present invention is not limited to such a configuration. The rotation member may be mounted on a mold other than the mold 20, or the rotation member may be mounted on none of molds.

(9) In the above-mentioned Embodiment 2, the metal-made coil spring is used as the return prevention member 80. However, the present invention is not limited to such a configuration. The return prevention member may be various kind of cylinders, a projectable and retractable pin or the like. That is, it is sufficient that the return prevention member be "a member which can prevent the rotation member from returning to the position taken during molding by entering a space formed by the movement of the rotation member after the rotation member is moved by the first projecting portions and the second projecting portions".

(10) The molding device and the method for manufacturing a molded product according to the present invention are also applicable to the manufacture of a molded product other than the molded product made of metal (for example, a molded product made of a resin).

(11) In the above-mentioned respective embodiments and the respective modifications, the rotation member is rotated after the pair of molds 10, 20 is separated from each other. However, the present invention is not limited to such a configuration. The rotation member may be rotated before the pair of molds is separated from each other, or the rotation member may be rotated simultaneously with the separation of the pair of molds.

The invention claimed is:

1. A molding device for manufacturing a molded product having an arc-shaped bent inner space, the molding device comprising:
    a pair of molds which are joinable to each other and separable from each other, and are capable of forming a cavity which has a shape corresponding to an outer shape of the molded product in a joined state during molding;
    a core which has a shape corresponding to an inner shape of the molded product, and is disposed in the inside of the cavity which the pair of molds forms during molding; and
    a rotation member which is joined to a terminal end of the core, and is rotatable together with the core after molding, wherein
    a side wherein the core is attached to the rotation member as one side, and a side opposite to the one side as an other side,
    the molding device further includes a fixing member capable of fixing the rotation member, and
    the fixing member is configured to fix the core and the rotation member by supporting the rotation member from the other side during molding, and the fixing member allows the rotation member to be rotatable by retracting from the other side of the rotation member after molding.

2. The molding device according to claim 1, wherein the rotation member is rotatable about a predetermined rotation axis.

3. The molding device according to claim 1, wherein,
    a position where the fixing member is arranged when the core is pulled out from the molded product as a retracting position and assuming a position where the fixing member is arranged during molding as a fixing position, and
    the fixing member is movable linearly between the retracting position and the fixing position.

4. The molding device according to claim 3, wherein
    a moving direction of the fixing member from the retracting position to the fixing position as a first direction, the rotation member has a first tapered portion which is inclined from the one side to the other side as the first tapered portion extends in the first direction, and the fixing member has a second tapered portion which is inclined from the one side to the other side as the second tapered portion extends in the first direction.

5. The molding device according to claim 3, wherein a moving direction of the fixing member from the retracting position to the fixing position as a first direction, the rotation member has a first projecting portion which projects from the other side to the one side, the fixing member has a second projecting portion which projects from the one side to the other side, a distal end of the first projecting portion is positioned on a distance along a first direction side in front of a distal end of the second projecting portion when the fixing member is at the retracting position, the distal end of the second projecting portion is positioned on the distance along the first direction side in front of the distal end of the first projecting portion when the fixing member is at the fixing position, the first projecting portion has a third tapered portion which is inclined from the one side to the other side as the third tapered portion extends toward the first direction on a first direction side, and the second projecting portion has a fourth tapered portion which is inclined from the one side to the other side as the fourth tapered portion extends toward the first direction on a side opposite to the first direction side.

6. The molding device according to claim 5, further comprising a return prevention member which is configured to prevent the rotation member from returning to a position taken during molding after the rotation member is moved by the first projecting portion and the second projecting portion, and the return prevention member is configured to prevent the rotation member from returning to the position taken during molding by entering a space formed by the movement of the rotation member after the rotation member is moved by the first projecting portion and the second projecting portion.

7. The molding device according to claim 3, wherein a moving direction of the fixing member from the retracting position to the fixing position as a first direction, and plane perpendicular to the first direction as a reference plane, and an angle made by a plane and the reference plane which intersects with the plane as a reference inclination angle, the rotation member has a first tapered portion which is inclined from the one side to the other side as the first tapered portion extends toward the first direction and a first projecting portion which projects from the other side to the one side, the fixing member has a second tapered portion which is inclined from the one side to the other side as the second tapered portion extends toward the first direction and a second projecting portion which projects from the one side to the other side, a distal end of the first projecting portion is positioned on a distance along a first direction side in front of a distal end of the second projecting portion when the fixing member is at the retracting position, and the distal end of the second projecting portion is positioned on the distance along the first direction side in front of the distal end of the first projecting portion when the fixing member is at the fixing position, the first projecting portion has a third tapered portion which is inclined from the one side to the other side as the third tapered portion extends toward the first direction on a first direction side, the second projecting portion has a fourth tapered portion which is inclined from the one side to the other side as the fourth tapered portion extends toward the first direction on a side opposite to the first direction side, and the first tapered portion and the second tapered portion have reference inclination angles equal to or less than reference inclination angles of the third tapered portion and the fourth tapered portion.

8. The molding device according to claim 1, wherein the molding device is a molding device for manufacturing a molded product made of metal as the molded product.

9. A method for manufacturing a molded product for manufacturing a molded product having an arc-shaped bent inner space, the method comprising:

a first step of forming by molding the molded product between a pair of molds capable of forming a cavity which has a shape corresponding to an outer shape of the molded product in a joined state and a core which has a shape corresponding to an inner shape of the molded product; and a second step of, after forming by molding the molded product, pulling out the core from the molded product by rotating the core by a rotation member joined to a terminal end of the core in this order, wherein a side wherein the core is attached to the rotation member as one side, and a side opposite to the one side as an other side, in the second step, a first force which is directed from the one side to the other side is applied to the rotation member first and, thereafter, a second force which is weaker than the first force and is a rotation force applied to the rotation member thus pulling out the core from the molded product.

10. The method for manufacturing a molded product according to claim 9, wherein the molded product is a molded product made of metal.

* * * * *